Jan. 20, 1970 W. M. BARDEAU ET AL 3,490,358
UTENSIL
Filed Jan. 8, 1968
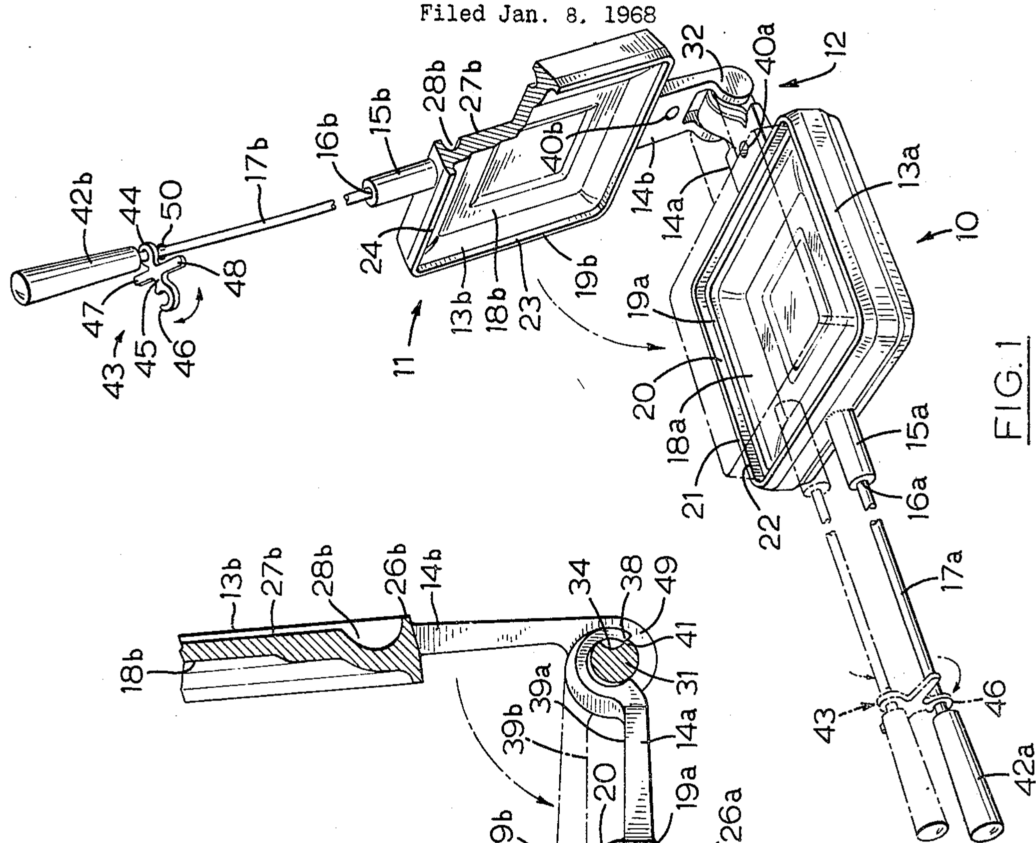
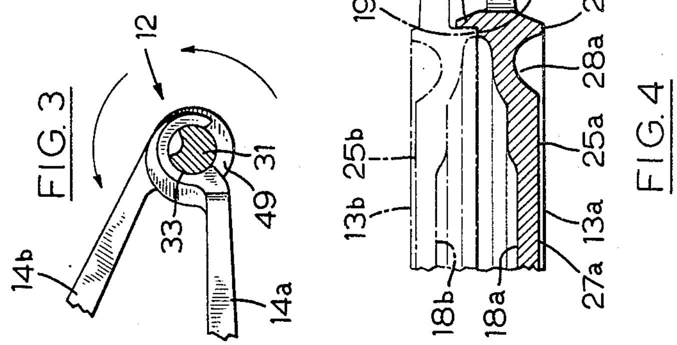
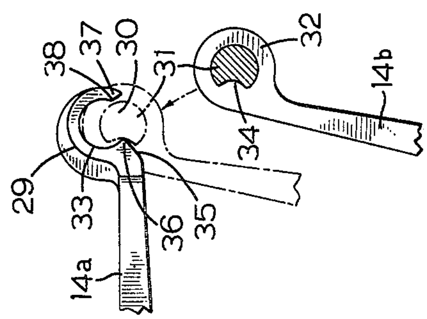
INVENTOR.
WILLIAM M. BARDEAU
GORDON W. BUTLER
JOSEPH SCHWARZLI
BY Weldon G. Green
PATENT AGENT 3,490,358

UTENSIL

William M. Bardeau, Islington, Ontario, Joseph Schwarzl, Scarborough, Ontario, and Gordon W. Butler, Toronto, Ontario, Canada, assignors, by mesne assignments, to John J. Connolly, New York, N.Y.

Filed Jan. 8, 1968, Ser. No. 696,426

Int. Cl. A47j *43/20, 37/06*

U.S. Cl. 99—353 12 Claims

ABSTRACT OF THE DISCLOSURE

A utensil for toasting, grilling or cooking sandwiches or the like in which a first mould part and a second mould part are adapted to register in mating relation to define a mould cavity, with the mould parts each provided with integral inter-engageable lug formations whereby the mould parts can be swung from a position in mating relation to a limit position out of mating relation with the lug formations inter-engaged characterized in that the lug formations are only inter-engageable at the limit position and vice versa.

This invention relates to improvements in a utensil for shaping and toasting, grilling or heating certain articles of food such as a sandwich.

The principal object of this invention is to provide a utensil operable in a simple progression of steps to trim the crusts of the slices of bread of a sandwich placed therein, seal the severed edges of the slices together and upon the application of heat to the utensil to toast the slices of bread and heat, grill or cook the filling to the desired degree.

Another object of the invention is to provide such utensil in the form of two basic components interengageable to serve the functions indicated, and separable one from the other for washing or storage or for any other purpose.

Still another object is to provide a utensil in which the two basic components can be cast in a mould thereby eliminating certain assembly procedures and hence minimizing the cost of manufacture.

The principal feature of this invention resides in providing two mould parts of like configuration adapted to register in mating relation to define a mould cavity for shaping and retaining an article of food and of a suitable metal capable of transferring heat to the desired degree, each mould part being provided with an integral lug formation, one inter-engageable with the other only in a selected limit position in which the mould parts are out of registration, to define a hinge or pivot about which the mould parts are swingable into and out of mating relation.

More particularly, the inter-engaging lug formations are of a dimension and structure capable of being cast in a mould and integral with its respective mould part, one lug formation taking the form of a hook or knuckle defined by forming in the lug formation adjacent one end thereof a channel formation consisting of a uniform bore of part circular cross section accessable from one side of the lug formation through an axially extending throat-defining narrow slot whose edges are spaced apart a distance less than the bore diameter for the reception of a bar formation presented by the other lug formation which bar is supported on spaced projections at each end and has a cross section conforming to the cross section of the channel formation, the bar being provided with an axially extending peripheral recess registrable with one edge portion defining the throat-defining slot of the other lug formation in the limit position only to thereby decrease in the limit position the effective diameter of the bar formation, the other edge portion of throat-defining slot being spaced from the first mentioned edge portion a distance sufficient to just clear the bar surface when the first mentioned edge portion is in full registration with the bar recess under swinging movement imparted to the bar moving it into full registration with the bore of the channel formation and vice versa.

Still another feature resides in dimensioning the bar formation and the bore formation so that when inter-engaged they have a slightly loose fit. With such loose fit there will be a tendency of one component to bear against the other at their lower most point of contact. In the preferred embodiment the mould part serving as the base of the utensil is provided with the lug formation in which the channel formation is formed and with the throat-defining slot of the channel formation opening substantially downwardly. In addition in the preferred embodiment the bar formation of the lug formation carried by the other mould part has its recess disposed substantially upwardly when the mould parts are in full mating relation. With this arrangement upon rotational movement imparted to the bar formation in a direction to pass the bar through the throat and into full registration with the bar of channel formation the surface of the bar formation will bear under gravity against the edge portions of the throat-defining slot. At the position in which the mating mould parts are approximately 90 degrees from their full mating position the lowermost edge of the recess in the bar will come into frictional contact with the edge portion of the throat-defining slot opposite to that which is adapted to be registered in the recess which frictional engagement under gravity is sufficient to stabilize the relative positions of the mould parts. Hence the utensil will maintain a stable position with the mould part moved 90 degrees from mating position and with the base or lower mould part resting on a level supporting surface.

Still another feature resides in providing each mould part with a handle formation the shafts of which diverge from their inner ends secured to their respective mould parts to their outer ends. By applying squeezing force to the hand gripping elements compressive force is applied to the mated mould parts for sealing the severed edges of a sandwich or article of food placed within the mould parts, together. Further this arrangement enables the handles to be secured together by a simple pivotal latch arrangement secured to one shaft and presenting a hook formation to the other shaft which hook formation is engageable with the other shaft only when the handles are moved toward one another under squeezing force thereby securing the mould parts against separation while the utensil is heated over a source of heat.

Other features of this invention will become apparent upon reading the following specification in conjunction with the accompanying drawings in which the preferred embodiment of the invention is illustrated and in which FIGURE 1 is a perspective view of the utensil with the relatively movable upper and lower components shown in solid outline and arranged in the open position and with the upper components shown in broken outline in the closed or mating position;

FIGURE 2 is a side elevational view of the hinge or pivot formation of the utensil of FIGURE 1 with the mould and other parts broken away showing the manner in which the lug formations must be presented for inter-engagement;

FIGURE 3 is a view similar to FIGURE 2 in which the lug formations are illustrated in full inter-engaged relation;

FIGURE 4 is a side elevational view of the utensil of FIGURE 1 illustrating the lug formations in the stop position with the upper and lower components at substantially right angles to each other, and with mould and other parts broken away.

The utensil of FIGURE 1 comprises essentially a first or lower component 10 and a second or upper component 11 connected together at one side by a hinge formation 12 for relative swinging movement from an open position represented by the upper component 11 in solid outline to a closed position represented by the upper component 11 in broken outline.

Component 10 comprises a mould part 13a, an integral lug formation 14a constituting part of the hinge 12, an integral projection 15a which is provided with a central bore 16a to receive one end of a shaft 17a of one handle.

Likewise upper component 11 comprises a mould part 13b adapted to mate with lower mould part 13a as will be described, an integral lug formation 14b constituting part of the hinge formation 12, and integral projection 15b provided with a central bore 16b to receive one end of a shaft 17b of the other handle.

In the preferred embodiment each mould part with its integral lug formation and projection is cast from a metal or metal alloy characterized by its ability to flow into the mould in the casting operation and to take the requisite configuration defined by the mould and when cooled possesses the requisite strength, heat conductivity and suitability for use with food.

The dimensions and contour of the surfaces 18a and 18b of the mating mould parts 13a and 13b defining the mould cavity in mating relation correspond. In the preferred embodiment the contour of each surface is somewhat dish-shaped or concave and of rectilinear outline, rounded at the corners and at the lines of intersection of the several planes and have overall dimensions to accommodate slices of bread and filling making up a sandwich.

Mould parts 13a and 13b in mating relation as illustrated in FIGURES 1 and 4 define a somewhat lenticular cavity which configuration is applied to the slices of bread and filling placed within the mould parts and grilled.

Each mould part 13a and 13b presents to the other a peripheral flat shoulder formation 19a and 19b which are adapted in the fully mated position to bear against one another tending to seal the cavity so defined.

Upstanding outwardly of the flat shoulder formation 19a of mould part 13a is a surrounding integral wall 20 terminating at its upper end in a peripheral flat surface 21 which has been formed by a grinding operation to create a surrounding relatively sharp edge 22.

The surrounding wall 20 closely embraces the outer wall 23 of upper mould part 13b as it moves from the open position into full mating relation with lower mould part 13a.

Shoulder formation 19b in the preferred embodiment is formed by a grinding operation to present a relatively sharp peripheral edge 24. In addition the outer surrounding surfaces of the wall 23 are slightly ground to remove any metal burrs and to enhance the sharpness of edge 24.

It will be readily understood that the crusts or peripheral portions of slices of bread of the sandwich placed between the mould parts will be sheared off when the mould parts are fully closed and that the severed edges of the slices of bread remaining will be pressed together between the shoulder formation 19a and 19b which upon the application of heat tend to become sealed together.

The outer surfaces 25a and 25b of mould parts 13a and 13b have in the preferred embodiment a substantially identical configuration. Each have a flat peripheral edge formation 26a and 26b respectively and a central plateau portion 27a and 27b respectively following the outline of the edge formation and separated by a substantially smoothly contoured recess 28a and 28b respectively.

Edge formations 26a and 26b stand preferably slightly above the plane of the plateau portions 27a and 27b. The plateau portions are adapted to be provided with indicia such as a trade mark or other inscription which preferably is cast into the mould parts and in that event take the form of raised lettering or characters which, however, do not project beyond the plane of the surrounding flat edges.

This structure insures the stability of the device when it rests upon a flat surface and as well provides a substantial area of contact for heat transfer between the heated resistance element of an electric stove where that source heat is used.

The grooves 28a and 28b are formed in the castings to save metal, decrease the weight of the unit and to enhance the heat conductivity of the mould parts.

The integral lug formations 14a and 14b constituting hinge formation 12 are separable as illustrated in FIGURES 2 and 3 of the drawings.

Lug formation 14a presents a channel formation 29 at the end thereof remote from mould part 13a including a part circular bore 33 opening to one side of the lug formation through an axially extending slot 30 whose edges are spaced apart less than the diameter of the bore which is adapted to receive a bar formation 31 mounted between spaced projections 32 presented by lug formation 14b at the end thereof remote from mould part 13b.

The part circular open ended bore 33 of channel formation 29 has a radius slightly greater than the radius of bar formation 31 in cross section which when registered provides a slightly loose fit for reasons that will appear.

Bar formation 31 is provided with an axially extending recess 34 smoothly contoured and having a somewhat parabolic configuration in cross section, with the open side of the recess disposed upwardly when mould part 13b is in the mating position shown in broken outline in FIGURE 1 and FIGURE 4.

Throat defining slot 30 of channel formation 29 in the same views is disposed downwardly.

FIGURES 2 and 3 of the drawings illustrate the manner in which bar formation 31 may be engaged in or disengaged from channel formation 29.

It will be seen in FIGURES 2 and 3 that the walls of the throat defining slot 30 are bevelled as at 35 to form an acute angle at its juncture with the surface of bore 33 thereby providing a relatively sharp edge portion 36 and bevelled as at 37 to form an obtuse angle to provide a less sharp edge portion 38, which edge portions define the throat of slot 30 through which the bar formation 31 must pass.

In order to register bar formation 31 within the part circular open ended bore 33 of channel formation 29, the integral lug formations 14a and 14b must be disposed as shown in FIGURE 2 with the edge portion 36 fully registered within the axially extending recess 34 of bar formation 31. The angle of the bevel 35, the dimensions of the throat-defining slot 30 and the contour and dimensions of the recess 34 have all been selected so that with the edge portion 36 fully registered in recess 34 and upon application of counterclockwise movement to the upper component 11 bar formation 31 clears the throat defining slot edge portion 38. Further counterclockwise movement fully registers bar formation 31 within bore 33 and thereafter as the upper component 11 is moved in a counterclockwise direction the parts are fully interengaged.

The bearing surfaces 49 of support projections 32 in all positions prevent lateral displacement of bar formation 31 in bore 33.

The axis of the hinge formation 12 so defined lies substantially in the plane of contact of the mating mould parts 13a and 13b in the preferred embodiment.

The axis of hinge formation 12 is substantially offset from the mould parts not only to facilitate inter-engagement and disengagement in the manner described but also to diminish the angle between the mould parts as they approach the mating position, which minimizes the tendency to squeeze the filling out of the sandwich upon the application of force to the mould parts to shear off the crusts of the slices of bread and to urge the sandwich into the mould cavity.

It will also be observed that those portions 39a and 39b of the lug formations 14a and 14b supporting respectively the channel formation 29 and the projections 32 between which bar formation 31 extends are spaced apart in the mating position of the mould parts thereby defining a recess to receive the crusts or edge portions of the sandwich disposed therebetween prior to shearing off those edge portions. In the embodiment illustrated the supporting portions 39a and 39b are apertured as at 40a and 40b which are aligned in the mating position of the mould parts for registering with a support hook on a storage wall.

The limit position illustrated in FIGURE 2 is the sole position of inter-engagement and disengagement of the lug formations 14a and 14b. However, the configuration of the inter-engaging parts serve another function.

As the upper component 11 is swung counterclockwise recess 34 is moved to a position where its lower edge 41 as seen in FIGURE 4 registers with edge portion 38 of throat-defining slot 30. In this position because of the slightly loose fit the upper component 11 is urged under gravity downwardly and the edge formations 38 and 41 tend to frictionally engage constituting a stop position.

It will be seen from the drawings that the disposition of the recess 33 and the throat-defining slot 30 are such that with the edge portions 38 and 41 frictionally engaged the upper component 11 is substantially at right angles to the lower component 10. With the lower component supported on a flat surface this open position is relatively stable facilitating the preparation and placing of a sandwich in the utensil. The upper component 11 is then released from the stop position merely by lifting it vertically.

In FIGURE 1 it will be observed that the shafts 17a and 17b of the handles are rigidly anchored within the bores 16a and 16b respectively of projections 15a and 15b in slightly diverging relation so that the outer ends are further apart than the inner ends.

Mounted next adjacent the upper hand gripping element 42b is a latch 43 consisting of an annular portion 44 sleeved over shaft 17b, a shank portion 45 terminating in a hook formation 46 at the opposite end. Intermediately of the extent of the shank are two finger engaging projections 47 and 48 extending substantially at right angles to the shank.

Shafts 17a and 17b in the preferred embodiment are formed from cold drawn steel and possess an inherent stiffness or resiliency. The extent of shank portion 45 of the latch is less than the spacing between the shafts in their normal attitude. In order that the hook formation 46 can engage the lower shaft 17a next adjacent hand-gripping element 42a the hand-gripping elements must be gripped and urged together. When engaged the tendency of the shafts to return to their original positions because of their inherent stiffness or resiliency frictionally locks the hook formation 46 to shaft 17a. In addition it will be appreciated that under the application of force the opposed shoulder formations 19a and 19b of mould parts 13a and 13b are urged together tending to seal the edges of the sandwich there-between and the cavity.

It will readily be understood that the finger engaging projection 47 serves on the one hand to swing the hook formation 45 into the locked position and finger engaging projection 48 on the other hand to swing the hook formation 45 out of the locked position.

The latch 43 is prevented from travelling along shaft 17b by staking two projections 50 on the shaft surface immediately adjacent and forwardly of the annular portion 44 thereof.

In accordance with the invention any slice of bread that will cover the mould parts 13a, 13b may be used. The filling for the sandwich is heaped centrally between the slices of bread. The upper component 11 is unlatched from lower component 10 by depressing the finger engaging projection 48 releasing hook formation 45 from shaft 17a and upper component 11 raised until edge portion 38 of throat defining slot 30 frictionally engages edge portion 41 of recess 34, the stop position in which upper component 11 is substantially vertical.

The sandwich is then placed over mould part 13a. A slight lifting motion of upper component 11 will release it from the stop position and then the mould parts 13a, 13b can be moved into mating relation as shown in FIGURE 1 in broken outline to trim off the crusts of the bread slices by the shearing action of co-operating edges 22 and 24 of the mould parts. The severed edges of the bread slices will then be compressed and firmly sealed between the shoulder formations 19a, 19b of the mould parts and locked in position by registering the hook formation 45 of latch 43 with shaft 17a upon depression of finger engaging projection 47 while squeezing hand gripping elements 42a, 42b together.

The device may be used with any source of heat, a gas or electric kitchen range, outdoor grill, fireplace or campfire.

The upper and lower components 11 and 12 following use of the utensil can be separated as described when necessary for washing or storage.

What we claim as our invention is:

1. In a utensil, a first mould part, a second mould part adapted to register with said first mould part in mating relation to define a mould cavity, said first and second mould parts each having first and second integral means, respectively, inter-engageable to provide a hinge for relative rotational movement of said mould parts, said first integral means comprising a substantially circular bore portion communicating with the exterior through an axially extending slot defining a throat with a reduced width relative to the diameter of the bore; said second integral means comprising a substantially circular bar with the diameter substantially equal to the inner diameter of said bore and an axially extending recess on said bar, said recess having opposed edges and so dimensioned whereby in a first position one of said edges of said recess engages a first interior part of said bore, said recess being further characterized in that when said mould parts are in mating relation said recess is substantially diametrically opposed to said throat and upon rotation of said second mould part through substantially ninety degrees said one of said edges of said recess engages a second interior part of said bore, chordally displaced from said first mentioned part of said bore, to hold said mould parts in a substantially stable attitude.

2. A utensil according to claim 1 in which the throat-defining slot and the recess of the bar are so disposed in its respective lug that interengagement and disengagement of the lug can be effected only in position more than 180 degees out of mating relation of the respective mould parts.

3. A utensil according to claim 1 in which each said mould part is provided with a peripheral shoulder formation which are adapted ot bear one against the other with the mould parts in mating relation.

4. A utensil according to claim 3 in which one of said mould parts is provided with a peripheral wall upstanding around its peripheral shoulder formation and the other said mould part has a configuration to snugly register within said peripheral wall with said mould parts disposed in mating relation.

5. A utensil according to claim 4 in which said peripheral wall formation of said one mould part terminates at its upper end in a sharp edge and the shoulder formation of the other mould part terminates in a sharp peripheral edge, whereby under relative swinging movement of said mould parts into mating relation a shearing action is achieved.

6. A utensil according to claim 1 in which the swinging axis defined by the inter-engaged lug spaced from the mould parts to diminish the angle between the mould parts as the mould parts approach and move into mating relation.

7. A utensil according to claim 1 in which each said mould part and its integral lug formation are cast in a single piece.

8. A utensil according to claim 1 in which the outer surfaces of the mould parts have a generally planar configuration and when disposed in mating relation lie in substantially parallel planes, and in which position the lugs lie within such parallel planes so defined.

9. A utensil according to claim 8 in which the outer surfaces of each said mould part each present a peripheral flat shoulder formation and a central plateau portion slightly below its said shoulder formation and separated from its peripheral shoulder formation by a peripheral recess.

10. A utensil according to claim 1 in which each said mould part has a generally rectilinear configuration and the cavity defined by said mould parts in mating relation has a generally lenticular configuration.

11. A utensil according to claim 1 in which each said mould part is provided with a handle formation at the side opposite to its lug formation for moving the mould parts from an open posiiton into registration in mating relation, characterized in that the shafts of each handle formation have a measure of stiffness and resiliency and diverge from their inner ends to their outer ends with the mould parts in full mating relation, and a swingable latch carried by one shaft of one handle formation releasably inter-engageable with the shaft of the other handle formation only when the handle formations are urged towards one another with the mould parts in full mating relation and vice versa.

12. A utensil according to claim 11 in which said latch mechanism comprises an annular portion sleeved unto one shaft portion, a shank portion having an extent less than a separation of the shaft portions of the handle formations in their normal attitude with the mould parts in mating relation, the end of said shank portions remote from said annular portion presenting a hook formation adapted to surround and engage the other shaft portion, whereby under the tendency of the resilient shafts to return to their normal posiiton the hook formation is frictionally engaged against separation, and finger engaging projection means integral with and extending substantially transversely of the shank portion of the latch intermediately of its extent for swinging the latch in a direction to engage the hook formation with said shaft portion and vice versa.

References Cited

UNITED STATES PATENTS

| | | | |
|---|---|---|---|
| 602,101 | 4/1898 | Perry. | |
| 2,365,378 | 12/1944 | Benson | 16—171 |
| 2,463,439 | 3/1949 | Strietelmeier | 99—380 XR |
| 2,582,692 | 1/1952 | Funke | 99—372 |
| 3,083,651 | 4/1963 | Cooper | 107—1.6 |
| 3,358,586 | 12/1967 | Thorngren. | |

FOREIGN PATENTS

| | | |
|---|---|---|
| 309,368 | 11/1955 | Switzerland. |

WALTER A. SCHEEL, Primary Examiner

ARTHUR O. HENDERSON, Assistant Examiner

U.S. Cl. X.R.

99—380